US008077363B2

(12) United States Patent
Sasaki

(10) Patent No.: US 8,077,363 B2
(45) Date of Patent: Dec. 13, 2011

(54) BLOCK MATCHING CIRCUIT AND DATA UPDATE METHOD

(75) Inventor: Gen Sasaki, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 768 days.

(21) Appl. No.: 12/205,153

(22) Filed: Sep. 5, 2008

(65) Prior Publication Data

US 2009/0067015 A1 Mar. 12, 2009

(30) Foreign Application Priority Data

Sep. 12, 2007 (JP) ................................. 2007-236644

(51) Int. Cl.
*H04N 1/46* (2006.01)
(52) U.S. Cl. ........ 358/505; 358/474; 358/501; 382/195; 382/248; 348/222.1; 348/272; 345/589; 345/690; 375/240.16
(58) Field of Classification Search .................. 358/505, 358/501, 488, 486, 474, 475, 509; 382/295, 382/107, 275, 166, 248, 304, 218, 297; 348/222.1, 348/272, 312, 43, E13.001, 208.99; 345/159, 345/589, 690, 625, 565; 375/240.16
See application file for complete search history.

(56) References Cited

U.S. PATENT DOCUMENTS

| | | | | |
|---|---|---|---|---|
| 5,509,083 A * | 4/1996 | Abtahi et al. .................. 382/124 |
| 6,384,859 B1 * | 5/2002 | Matsumoto et al. ............. 348/43 |
| 7,268,803 B1 * | 9/2007 | Murata et al. ............... 348/218.1 |
| 7,486,827 B2 * | 2/2009 | Kim ............................... 382/209 |
| 7,505,617 B2 * | 3/2009 | Fu et al. .......................... 382/128 |
| 7,532,804 B2 * | 5/2009 | Kim ............................... 386/252 |
| 7,680,186 B2 * | 3/2010 | Lee et al. .................. 375/240.16 |
| 7,692,688 B2 * | 4/2010 | Kurata ........................ 348/208.5 |
| 7,800,624 B2 * | 9/2010 | Kondo et al. .................. 345/565 |
| 2007/0188619 A1 * | 8/2007 | Kurata ...................... 348/208.99 |
| 2007/0195172 A1 * | 8/2007 | Kurata ...................... 348/208.99 |
| 2008/0032845 A1 * | 2/2008 | Hiraiwa ......................... 475/205 |
| 2010/0149210 A1 * | 6/2010 | Matsunaga et al. ........... 345/625 |

FOREIGN PATENT DOCUMENTS

JP 2006-33145 2/2006

* cited by examiner

*Primary Examiner* — Negussie Worku
(74) *Attorney, Agent, or Firm* — Oblon, Spivak, McClelland, Maier & Neustadt, L.L.P.

(57) ABSTRACT

Scanning image data and target image data are respectively stored in a first storage area and a second storage area. In one case, $(J-M+1) \times (K-N+1) \times M \times N$ pieces of pixel data are stored as comparison image data relating to all comparison areas, and $M \times N$ pieces of pixel data are stored as target image data. In contrast, the present invention requires the storage only of $J \times K$ pieces of pixel data as scanning image data, and $M \times N$ pieces of pixel data as target image data. This means the number of pieces of pixel data to be stored is reduced. In the case discussed above, one piece of target image data and $(J-M+1) \times (K-N+1)$ pieces of pixel data relating to all comparison areas and corresponding to this target image data are stored. As compared to this case, the number of times pixel data are retrieved is reduced to $1/(M \times N)$, thereby shortening processing speed.

20 Claims, 13 Drawing Sheets

F I G . 8
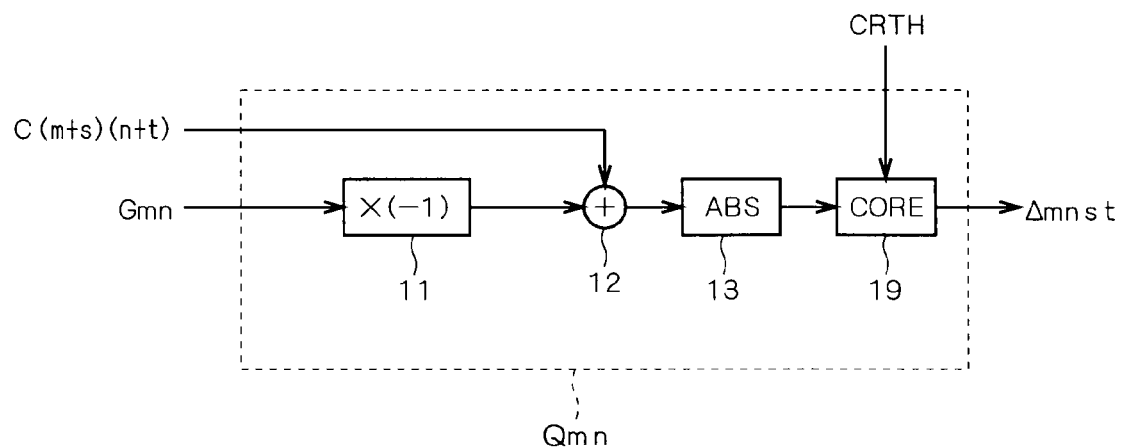
F I G . 9
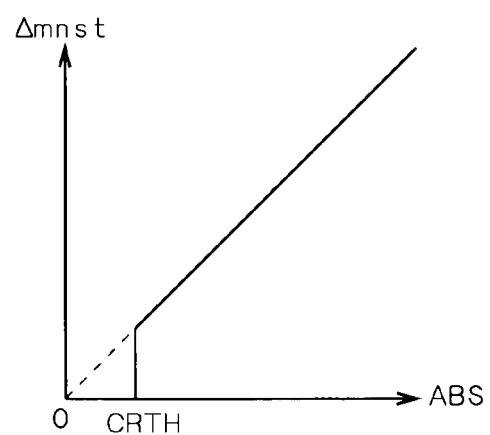

F I G . 1 7

| | [W] | | [3] | [2] | [1] |
|---|---|---|---|---|---|
| PSF | 0 | ... | 1 | 0 | 0 |

BLOCK MATCHING CIRCUIT AND DATA UPDATE METHOD

BACKGROUND OF THE INVENTION

1. Field of the Invention

The present invention relates to image processing, and more particularly, to block matching for determining the similarity between images.

2. Description of the Background Art

A motion vector indicative of the motion of an object appearing on each frame is obtained for example by determining the similarity between one fame and another frame of moving images. More specifically, an image area including this object is cut out from one frame, and then it is determined which image area in another frame corresponds to this image area. Such determination of the similarity between images is realized by block matching (see for example Japanese Patent Application Laid-Open No. 2006-33145).

In the block matching, similarity is determined between a target area cut out from one frame and an area (hereinafter referred to as a "comparison area") obtained by scanning a particular area in another frame (which may be an entire area and is hereinafter referred to as a "scanning area"). Such similarity is regarded as being the similarity between the target area and the comparison area in their entirety. As a specific example, a pixel in a target area and a pixel or pixels in a comparison area are compared. Then, results of comparisons between pixels are accumulated throughout the comparison area to determine the similarity between the target area and the comparison area. As a result of the comparison between pixels, a value indicative of the difference between pixels (hereinafter referred to as a "pixel difference value") is adopted which is for example the absolute value of the difference between values (such as brightness) of the pixels (hereinafter referred to as a "pixel difference absolute value)." The similarity discussed above is obtained as the total sum of these pixel difference values.

The above-discussed similarity is obtained for each comparison area, so a comparison area with the highest degree of similarity to a target area is found in a scanning area. Thus, a motion vector is obtained based on the position of a target area in one frame and the position of a comparison area in another frame.

In order to specify a comparison area in a scanning area that is similar to a target area, a process step for obtaining a pixel difference value should be executed a number of times corresponding to the product of the number of operations performed between one target area and one comparison area as a pair and the total sum of comparison areas obtained by scanning.

For simplification, a target area and a comparison area are regarded as being of the same size. Then, it is assumed that a pixel difference value is obtained between a pixel holding a relative position in the target area and a pixel holding this relative position in the comparison area.

If the target area is expressed as a group of pixels arranged in M rows and N columns, and a scanning area is expressed as a group of pixels arranged in J rows and K columns (where J, K, M and N are positive integers satisfying J>M and K>N), the number of comparison areas obtained in this scanning area is expressed as (J−M+1)×(K−N+1).

If pixel data corresponding to this number of comparison areas are accumulated in advance, and pixel difference values are obtained simultaneously between pixels of the pixel data of the comparison areas and corresponding pixels of the pixel data of the target area, the process step related thereto may be expedited. This however requires the storage of data of M×N pixels as the total number of pixels of the target region, and the storage of data of (J−M+1)×(K−N+1)×M×N pixels of the comparison areas. This technique disadvantageously requires a huge storage area.

This disadvantage may be overcome by one exemplary way in which pixel difference values are obtained simultaneously with respect to a plurality of comparison areas by using one pixel in a target area and respective pixels in the plurality of comparison areas corresponding to this pixel in the target area.

This case requires the storage of one pixel data relating to a target area, so when compared to the technique previously discussed, the number of pieces of pixel data to be stored is reduced to 1/(M×N). In the block matching technique, however, the similarity of images is obtained as the total sum of absolute values as discussed above. This naturally means that processing time required in this case is M×N times the processing time required in the previously discussed technique. Further, pixel data relating to a target area should be retrieved M×N times, and the retrieval of pixel data is generally accompanied by overhead. This technique thus results in longer processing time.

SUMMARY OF THE INVENTION

It is an object of the present invention to solve the above-discussed problems. The present invention provides a technique of reducing the number of data retrievals to shorten processing time while reducing the number of pieces of data to be stored to realize shrinkage of a storage area.

A block matching circuit of a first aspect of the present invention includes: a first storage area for storing scanning image data that is pixel data corresponding to each one of pixels arranged in J rows and K columns contained in a scanning area that is an image area to be subjected to comparison in block matching; a second storage area for storing target image data that is pixel data corresponding to each one of pixels arranged in M rows and N columns contained in a target area that is an image area functioning as a standard for the comparison in the block matching, J, K, M and N being integers satisfying J>M and K>N; M×N operation circuits for obtaining pixel difference values indicative of differences between corresponding pixels, the pixel difference values being obtained between comparison image data and the target image data, the comparison image data being pixel data corresponding to each one of pixels arranged in M rows and N columns contained in each one of a plurality of comparison areas that are obtained by scanning the scanning area; M×N selection circuits for selecting the comparison image data for each one of the comparison areas from the first storage area and outputting the selected comparison image data to the operation circuits; an accumulation circuit for obtaining respective cumulative totals for the comparison areas, the cumulative totals each being given by accumulating the pixel difference values; and a matching judgment section for comparing the respective cumulative totals obtained for the comparison areas to specify the comparison area providing the minimum of the cumulative totals.

According to a second aspect of the block matching circuit of the present invention, in the first aspect, the selection circuit corresponding to a pixel in the $m^{th}$ row and $n^{th}$ column of the target area (where m is an integer of 1 to M and n is an integer of 1 to N) is configured to: receive (J−M+1)×(K−N+1) pieces of the scanning image data that correspond to pixels in the $m^{th}$ row to the $(m+J-M)^{th}$ row and in the $n^{th}$ column to the (n+K−N) column of the scanning area; and when the comparison area is shifted in position from the scanning area by s rows and t columns (where s is an integer of 0 to (J−M), and t is an integer of 0 to (K−N)), output the scanning image data corresponding to a pixel in the $(m+s)^{th}$ row and $(n+t)^{th}$ column.

According to a third aspect of the block matching circuit of the present invention, in the second aspect, the operation circuit corresponding to a pixel in the $m^{th}$ row and $n^{th}$ column of the target area includes: a subtracting circuit for obtaining the difference in value between the target image data corresponding to a pixel in the $m^{th}$ row and $n^{th}$ column of the target area and the scanning image data corresponding to a pixel in the $(m+s)^{th}$ row and $(n+t)^{th}$ column of the scanning area; and an absolute value circuit for obtaining the absolute value of a result of the subtracting circuit.

According to a fourth aspect of the block matching circuit of the present invention, in the second aspect, the operation circuit corresponding to a pixel in the $m^{th}$ row and $n^{th}$ column of the target area includes: a first subtracting circuit for subtracting an offset from the value of the target image data corresponding to a pixel in the $m^{th}$ row and $n^{th}$ column of the target area; a second subtracting circuit for obtaining the difference between an output of the first subtracting circuit and the value of the comparison image data corresponding to a pixel in the $(m+s)^{th}$ row and $(n+t)^{th}$ column of the scanning area; and an absolute value circuit for obtaining the absolute value of a result of the second subtracting circuit.

According to a fifth aspect of the block matching circuit of the present invention, in the fourth aspect, the offset is at a constant value independent of the value of the target image data.

According to a sixth aspect of the block matching circuit of the present invention, in the fourth aspect, the offset is the mean value of the target image data.

According to a seventh aspect of the block matching circuit of the present invention, in the second aspect, the operation circuit corresponding to a pixel in the $m^{th}$ row and $n^{th}$ column of the target area includes: a first subtracting circuit for subtracting an offset from the value of the scanning image data corresponding to a pixel in the $(m+s)^{th}$ row and $(n+t)^{th}$ column of the scanning area; a second subtracting circuit for obtaining the difference between the value of the target image data corresponding to a pixel in the $m^{th}$ row and $n^{th}$ column of the target area and an output of the first subtracting circuit; and an absolute value circuit for obtaining the absolute value of a result of the second subtracting circuit.

According to an eighth aspect of the block matching circuit of the present invention, in the seventh aspect, the offset is at a constant value independent of the value of the scanning image data.

According to a ninth aspect of the block matching circuit of the present invention, in the seventh aspect, the offset is the mean value of M×N pieces of pixel data corresponding to pixels in the $(J−s+1)^{th}$ row to the $(J−s+M)^{th}$ row and in the $(K−t+1)^{th}$ column to the $(K−t+N)^{th}$ column of the scanning area.

According to a tenth aspect of the block matching circuit of the present invention, in any one of the third to ninth aspects, the operation circuit corresponding to a pixel in the $m^{th}$ row and $n^{th}$ column of the target area includes a coring circuit that outputs zero when an output of the absolute value circuit is not greater than a positive threshold value, the coring circuit outputting a value obtained by subtracting a nonnegative value from the output of the absolute value circuit when the output of the absolute value circuit is greater than the threshold value.

According to an eleventh aspect of the block matching circuit of the present invention, in any one of the first to tenth aspects, the matching judgment section receives the cumulative totals sequentially input thereto. The matching judgment section includes: a minimum value storage circuit for storing a storage value as a value to be stored, and updating the storage value using the cumulative totals when the cumulative totals input thereto are lower than the storage value; a minimum value position storage circuit for storing first data, each of (J−M+1)×(K−N+1) digits of the first data taking a binary number; and an update circuit for updating the first data. The update circuit is configured to: receive second data input thereto in synchronization with the cumulative totals, each of (J−M+1)×(K−N+1) digits of the second data taking a binary number while one of the (J−M+1)×(K−N+1) digits that is sequentially shifted in the second data exclusively taking a first value; and update the first data using the second data when the cumulative totals input thereto are lower than the storage value.

According to a twelfth aspect of the block matching circuit of the present invention, in the eleventh aspect, when the cumulative totals input thereto are equal to the storage value, the update circuit updates the first data using the logical sum for each digit of the second data and the first data stored most recently.

According to a thirteenth aspect of the block matching circuit of the present invention, in any one of the first to twelfth aspects, pixel data of the target image data is handled as cluster data that is pixel data corresponding to a group of pixels arranged in the same row of the target area.

According to a fourteenth aspect of the block matching circuit of the present invention, in the thirteenth aspect, the block matching circuit further comprises a plurality of selectors for performing swap of the cluster data for each column of the target area.

According to a fifteenth aspect of the block matching circuit of the present invention, in any one of the first to fourteenth aspects, pixel data of the scanning image data is handled as cluster data that is pixel data corresponding to a group of pixels arranged in the same row of the scanning area.

According to a sixteenth aspect of the block matching circuit of the present invention, in the fifteenth aspect, the block matching circuit further comprises a plurality of selectors for performing swap of the cluster data for each column of the scanning area.

According to a seventeenth aspect of the block matching circuit of the present invention, in any one of the first to sixteenth aspects, the block matching circuit further comprises a register for storing a flag. The plurality of comparison areas are obtained by scanning the scanning area in a row direction from the first row to the $J^{th}$ row, and scanning the scanning area in a column direction from the first column to the $K^{th}$ column. The scanning in the column direction has higher priority than the scanning in the row direction. The flag is set during the scanning in the column direction, while the flag is reset when the scanning reaches the $K^{th}$ column. Update of the scanning image data is rejected when the flag is set.

A data update method of the present invention is executed in the block matching circuit according to any one of the first to sixteenth aspects of the block matching circuit. The data update method comprises the steps of: obtaining the pixel difference value between the comparison image data and the target image data corresponding to a pixel in the first row and $N^{th}$ column of the target area, the comparison image data being the scanning image data corresponding to a pixel in the $(s+1)^{th}$ row and $K^{th}$ column (where s is an integer of 0 to (J–M)) of the scanning area; and thereafter, updating the scanning image data corresponding to pixels in the $(s+1)^{th}$ row and from the first column to the $K^{th}$ column of the scanning area. The plurality of comparison areas are obtained by scanning the scanning area in a row direction from the first row to the $J^{th}$ row, and scanning the scanning area in a column direction from the first column to the $K^{th}$ column. The scanning in the column direction has higher priority than the scanning in the row direction.

The first aspect of the block matching circuit of the present invention requires the storage only of J×K pieces of pixel data as scanning image data, and M×N pieces of pixel data as target image data. In one case, (J–M+1)×(K–N+1)×M×N pieces of pixel data are stored as comparison image data relating to all of the plurality of comparison areas, and M×N pieces of pixel data are stored as target image data. As compared to this case, the first aspect of the block matching circuit reduces the number of pieces of pixel data to be stored. In the case discussed above, one piece of target image data and (J–M+1)×(K–N+1) pieces of pixel data relating to all of the plurality of comparison areas and corresponding to this target image data are stored. As compared to this case, in the first aspect of the block matching circuit, the number of times pixel data are retrieved is reduced to 1/(M×N), thereby shortening processing speed.

According to the second aspect of the block matching circuit of the present invention, comparison image data to be subjected to operation together with the target image data is output corresponding to the position of the comparison area with respect to the position of the scanning area.

According to the third to ninth aspects of the block matching circuit of the present invention, a value determined by an output of the absolute value circuit such as the output of the absolute value circuit itself is employed as a pixel difference value.

According to the fourth to sixth aspects of the block matching circuit of the present invention, the similarity between the target area and the comparison area is determined after the target area is offset.

According to the fifth aspect of the block matching circuit of the present invention, the target area is subjected to what is called DC offset.

According to the sixth aspect of the block matching circuit of the present invention, the target area is subjected to what is called AC offset.

According to the seventh to ninth aspects of the block matching circuit of the present invention, the similarity between the target area and the comparison area is determined after the comparison area is offset.

According to the eighth aspect of the block matching circuit of the present invention, the comparison area is subjected to what is called DC offset.

According to the ninth aspect of the block matching circuit of the present invention, the comparison area is subjected to what is called AC offset.

According to the tenth aspect of the block matching circuit of the present invention, an output of the absolute value circuit is subjected to coring by using the threshold value, and a resultant value is employed as a pixel difference value. This results in the determination of similarity which exhibits high noise immunity.

According to the eleventh and twelfth aspects of the block matching circuit of the present invention, the position of the comparison area providing the minimum value of the cumulative totals is indicated by the first data.

The thirteenth aspect of the block matching circuit of the present invention realizes speedup in the data update of the second storage area.

According to the fourteenth aspect of the block matching circuit of the present invention, cluster data is easily handled regardless of whether little-endian or big-endian is employed for the target image data.

The fifteenth aspect of the block matching circuit of the present invention realizes speedup in the data update of the first storage area.

According to the sixteenth aspect of the block matching circuit of the present invention, cluster data is easily handled regardless of whether little-endian or big-endian is employed for the scanning image data.

According to the seventeenth aspect of the block matching circuit of the present invention, the update of the scanning image data does not prevent block matching.

According to the data update method of the present invention, the scanning image data is updated without preventing block matching.

These and other objects, features, aspects and advantages of the present invention will become more apparent from the following detailed description of the present invention when taken in conjunction with the accompanying drawings.

BRIEF DESCRIPTION OF THE DRAWINGS

FIG. 8 is a block diagram showing another exemplary structure of the operation circuit Qmn;

FIG. 9 is a graph showing a first characteristic of a coring circuit 19;

FIG. 17 shows an example of position information PSF; and

DESCRIPTION OF THE PREFERRED EMBODIMENTS

Figure 1:
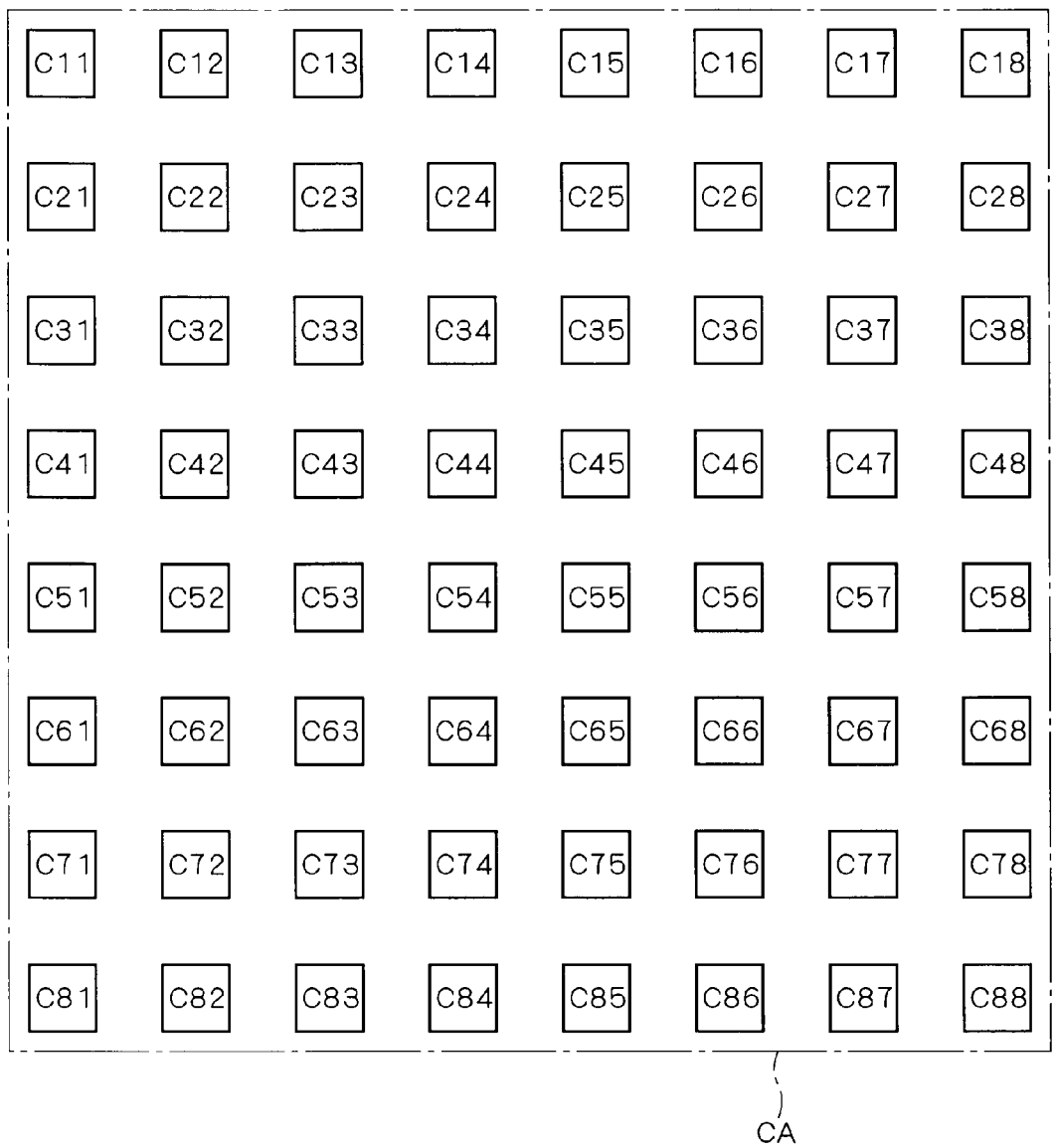
FIG. 1 schematically shows pixels arranged in J rows and K columns contained in a scanning area CA that is employed in a preferred embodiment of the present invention.

FIG. 1 schematically shows pixels arranged in J rows and K columns contained in a scanning area CA that is employed in a preferred embodiment of the present invention. The scanning area CA is an image area subjected to comparison in block matching.

Each pixel in the scanning area CA is identified by a symbol representing scanning image data that is pixel data of the corresponding pixel in the scanning area CA. As an example, a pixel in the $j^{th}$ row and $k^{th}$ column (where j is an integer of 1 to J, and k is an integer of 1 to K) has correspondence to scanning image data Cjk.

The indexes j and k respectively take maximum possible values J and K that are both "8." Accordingly, the scanning area CA has correspondence to scanning image data C11 through C88.

Figure 2:
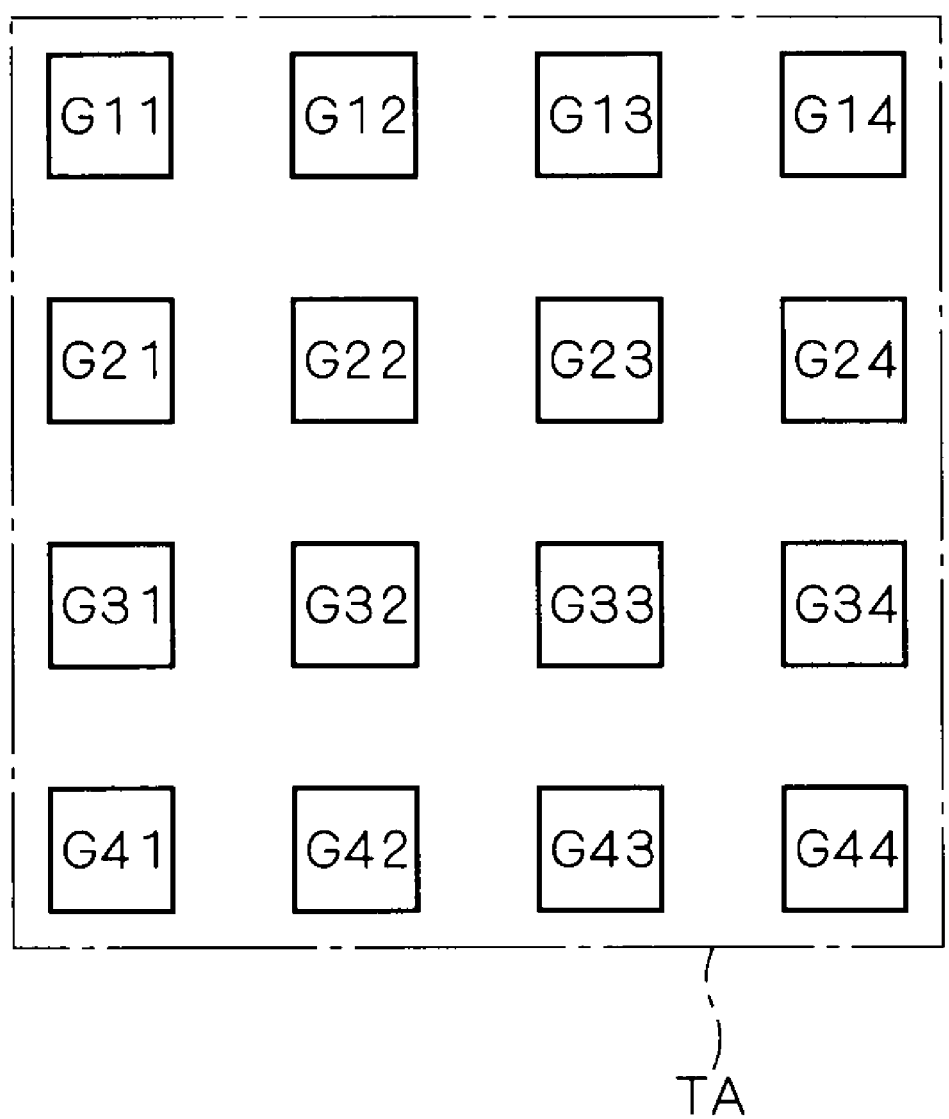
FIG. 2 schematically shows pixels arranged in M rows and N columns contained in a target area TA that is employed in the preferred embodiment of the present invention.

FIG. 2 schematically shows pixels arranged in M rows and N columns contained in a target area TA that is employed in the preferred embodiment of the present invention. The target area TA is an image area functioning as a standard for comparison in the block matching.

Each pixel in the target area TA us identified by a symbol representing target image data that is pixel data of the corresponding pixel in the target area TA. As an example, a pixel in the $m^{th}$ row and $n^{th}$ column (where m is an integer of 1 to M and n is an integer of 1 to N) has correspondence to target image data Gmn.

The indexes m and n respectively take maximum possible values M and N that are both "4." Accordingly, the target area TA has correspondence to target image data G11 through G44.

Figure 3:
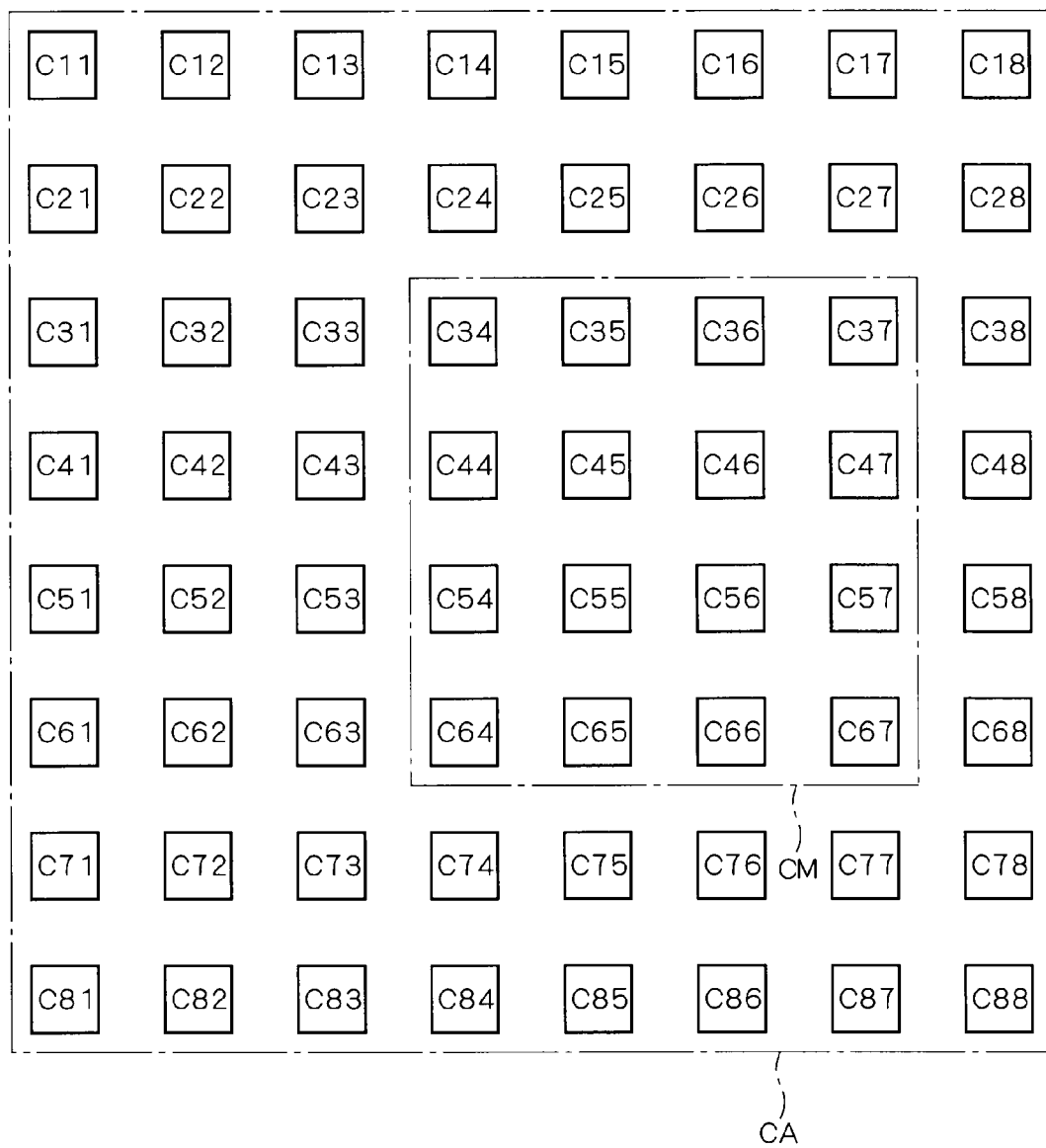
FIG. 3 schematically shows a relation between the scanning area CA and a comparison area CM.

FIG. 3 schematically shows a relation between the scanning area CA and a comparison area CM. Each comparison area CM contains pixels arranged in M rows and N columns. Pixel data corresponding to the pixels in the comparison area CM are referred to as comparison image data.

In FIGS. 1 to 3, the scanning image data Cjk and the target image data Gmn are shown to be arranged in a matrix, which is the way of illustration for the sake of convenience. In figures showing pixels arranged in a matrix, data are added to the corresponding pixels. That is, the scanning image data Cjk and the target image data Gmn are not actually arranged in a matrix.

The comparison area CM is generally obtained by scanning the scanning area CA in a row direction from the first row to the $J^{th}$ row, and scanning the scanning area CA in a column direction from the first column to the $K^{th}$ column. The scanning in the column direction has higher priority than the scanning in the row direction. The scanning of the scanning area CA is realized on a pixel basis. Alternatively, scanning may be performed after what is called "skipping" is performed per several pixels. However, the scanning on one pixel basis results in larger number of comparison areas CM in one scanning area CA and higher throughput. Assuming that the present preferred embodiment employs this way of scanning, it is discussed the present invention advantageously works even in such difficult conditions.

The position of the comparison area CM is determined by the relative positions of a pixel with the smallest row number and the smallest column number in the comparison area CM (hereinafter referred to as a "first pixel in a comparison area") and a pixel in the first row and the first column of the scanning area CA (hereinafter referred to as a "first pixel in a scanning area").

When the shift of the first pixel in a comparison area from the first pixel in a scanning area includes s rows in the row direction and t columns in the column direction, the position of the comparison area CM is expressed as a position (s, t). Here, s is an integer of 0 to (J–M), and t is an integer of 0 to (K–N). When s=t=0, there is no shift in position of the first pixel in a comparison area from the first pixel in a scanning area.

In the comparison area CM at the position (s, t), comparison image data C (m+s)(n+t) corresponds to the target image data Gmn. With reference to the example shown in FIG. 3, the comparison area CM is placed at the position (2, 3). Hence, comparison image data C34 is the first pixel in a comparison area corresponding to the target image data G11. From the formulas M+s=6 and N+t=7, the comparison area CM at the position (2, 3) has correspondence to a matrix with comparison image data C34 and C67 at opposite angles, and which includes comparison image data C34 to C37, C44 to C47, C54 to C57 and C64 to C67.

In the present preferred embodiment, all comparison areas CM are not subjected to the accumulation of comparison image data. Instead, J×K pieces of scanning image data Cjk are accumulated that correspond to pixels arranged in J rows and K columns of the scanning area CA. Each time the position (s, t), namely the comparison area CM is updated, M×N pieces of comparison image data C (m+s)(n+t) are selected from the scanning image data Cjk.

Figure 4:
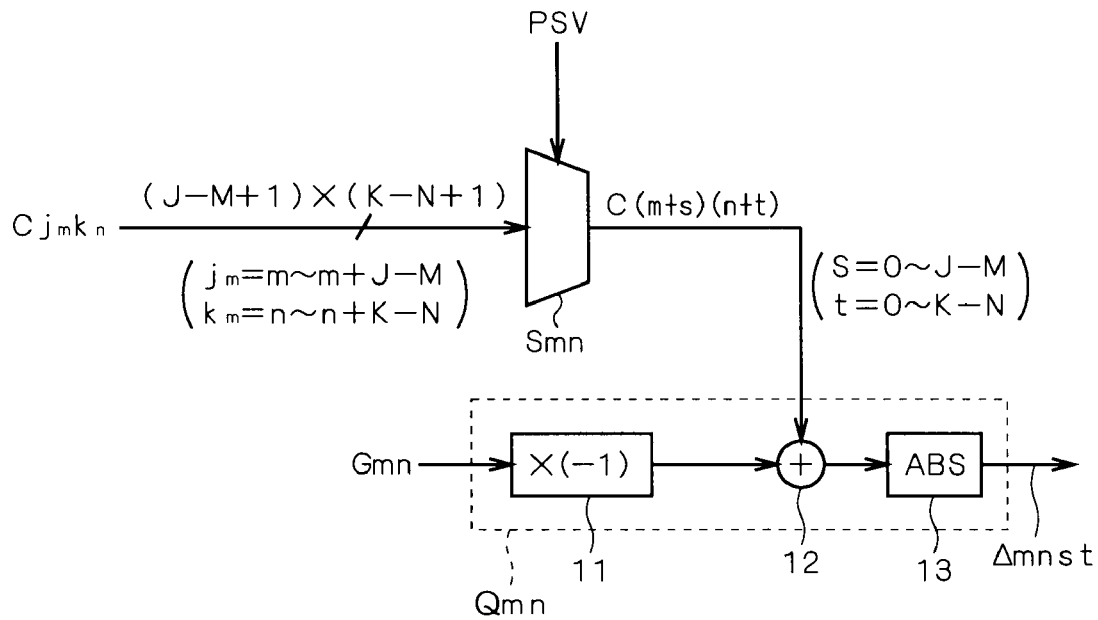
FIG. 4 is a block diagram showing a selection circuit Smn and an operation circuit Qmn.

FIG. 4 is a block diagram showing a selection circuit Smn and an operation circuit Qmn that are both responsible for pixels arranged in m rows and n columns of the target area TA. Accordingly, the selection circuit Smn and the operation circuit Qmn actually include 1 to M selection circuits Smn and 1 to M operation circuits Qmn respectively with regard to the row number m, and 1 to N selection circuits Smn and 1 to N operation circuits Qmn respectively with regard to the column number n. Thus, M×N selection circuits Smn and M×N operation circuits Qmn are provided.

Assuming that $j_m$ is an integer of m to (m+J–M), and $k_n$ is an integer of n to (n+K–1), (J–M+1)×(K–N+1) pieces of scanning image data $Cj_m k_n$ are given to the selection circuit Smn. Then, the comparison image data C(m+s)(n+t) is selected from the scanning image data $Cj_m k_n$ and is output from the selection circuit Smn. This selection by the selection circuit Smn is controlled by scanning information PSV designating the number of rows s and the number of columns t that represent the position of the comparison area CM. That is, the comparison image data C (m+s)(n+t) to be subjected to an operation together with the target image data Gmn is given according to the position of the comparison area CM with respect to the position of the scanning area CA. As an example, the scanning information PSV are parallel data containing (J–M+1)×(K–N+1) digits. Each of the (J–M+1)×(K–N+1) digits is capable of taking a binary number, and one of these digits exclusively takes a first value.

The target image data Gmn is given to the operation circuit Qmn. In the operation circuit Qmn, a multiplier (or reverser) 11 multiplies the target image data Gmn by "–1" (or reverses the polarity of the target image data Gmn). Then an adder 12 adds an output of the multiplier 11 and the comparison image data C (m+s)(n+t). Thereafter an absolute value circuit 13 obtains the absolute value of a result of addition given from the adder 12. The absolute value thereby obtained is employed as a pixel difference value Δmnst representing the difference between a pixel in the target area TA and a corresponding pixel in the comparison area CM.

The absolute value circuit 13 is operative in this manner. Hence, the multiplier 11 and the adder 12 are considered as a subtracting circuit for obtaining the difference between the comparison image data C (m+s)(n+t) and the target image data Gmn.

As one specific example, attention is directed to a selection circuit S34 and an operation circuit Q34 that are responsible for a pixel arranged in the third row and the fourth column of the target area TA (to which the target image data G34 corresponds).

Twenty-five (5×5) pieces of scanning image data C34 to C38, C44 to C48, C54 to C58, C64 to C68 and C74 to C78 are given to the selection circuit S34. When the comparison area CM is placed at the position (2, 3) (like the comparison area CM shown in FIG. 3), the formulas m+s=3+2=5 and n+t=4+3=7 are established. So scanning image data C57 is given as comparison image data from the selection circuit S34. This is demonstrated by the fact that, in the comparison area CM shown in FIG. 3, the scanning image data C57 corresponds to a pixel placed in the third row and in the fourth column.

The target image data G34 is given to the operation circuit Q34. When the comparison area CM is placed at the position (2, 3), the comparison image data C57 selected from the scanning image data C34 to C38, C44 to C48, C54 to C58, C64 to C68 and C74 to C78 is given to the operation circuit Q34. As a result, the operation circuit Q34 outputs a pixel difference value Δ3423.

Figure 5:
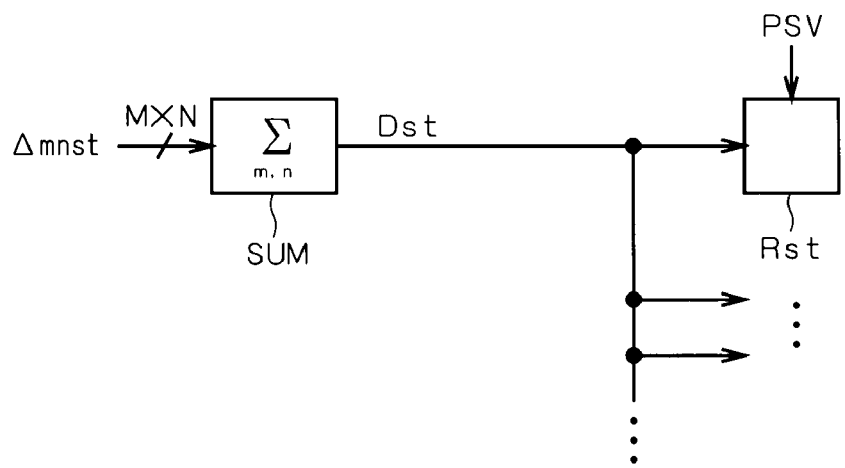
FIG. 5 is a block diagram showing a structure for accumulating pixel difference values Δmnst obtained per comparison area and throughout the comparison area CM.

FIG. 5 is a block diagram showing a structure for accumulating, throughout the comparison area CM, pixel difference values Δmnst obtained per comparison area. An accumulation circuit SUM receives M×N pixel difference values Δmnst obtained throughout the comparison area CM, performs total summation of the received pixel difference values Δmnst, and outputs a resultant cumulative total Dst. This total summation may be simple addition, or may be addition accompanied by weighting that depends on the row number m and the column number n.

Based on the scanning information PSV, the cumulative total Dst is stored in a register Rst that varies among positions (s, t). As an example, when the comparison area CM is placed at the position (2, 3), a cumulative total D23 is stored in a register R23.

The comparison area CM is obtained by scanning the scanning area CA. Thus, the cumulative totals Dst are output in serial form for different positions (s, t). Based on the scanning information PSV, only one register Rst selected from (J−M+1)×(K−N+1) registers R00 to R(J−M)(K−N) is activated to store the corresponding cumulative total Dst.

Figure 6:
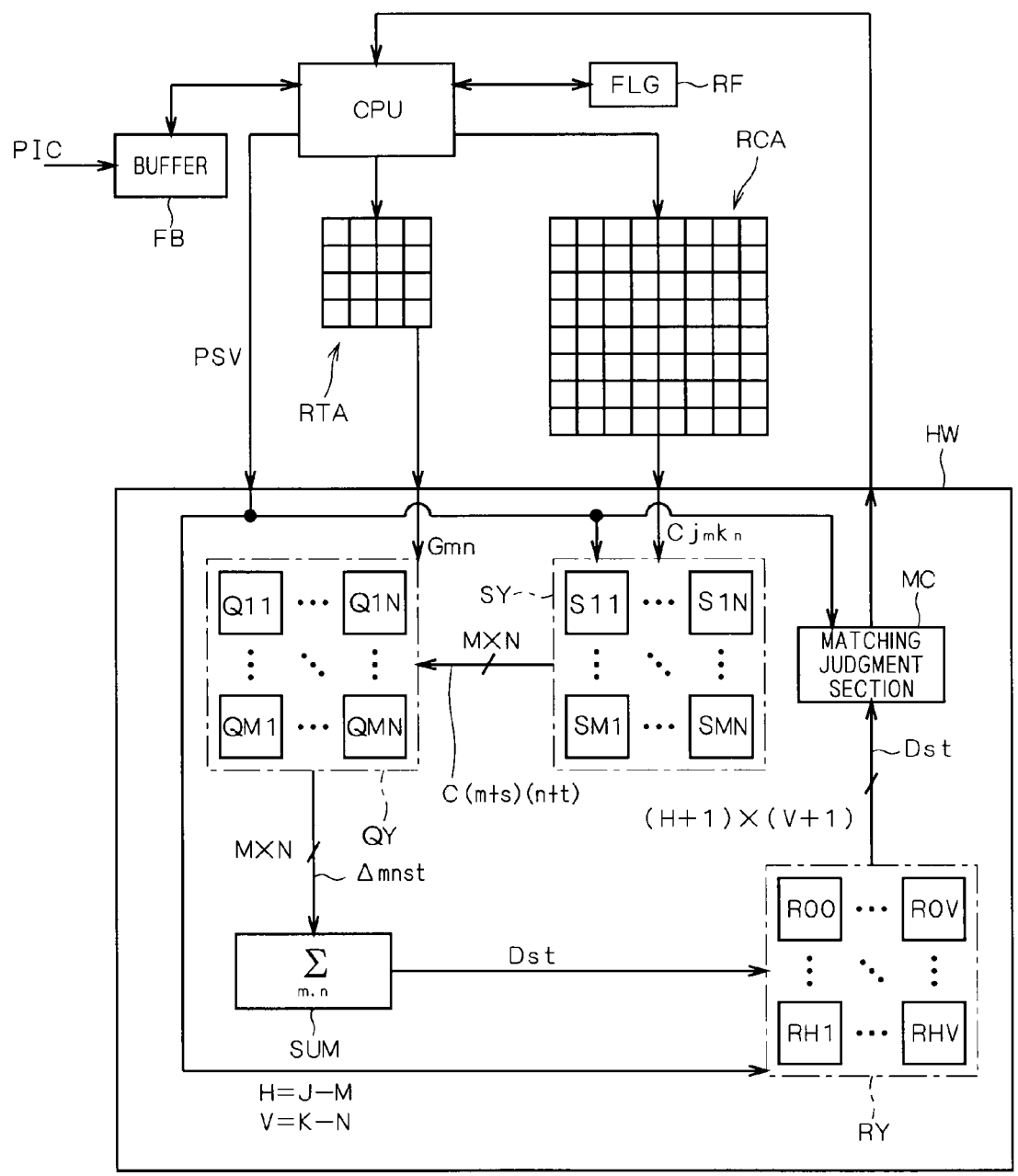
FIG. 6 is a block diagram schematically showing a structure for executing block matching according to the preferred embodiment of the present invention.

FIG. 6 is a block diagram schematically showing a structure for executing block matching according to the present preferred embodiment. Image data PIC is given to a frame buffer FB for each frame. Under control of a central processing unit CPU, the scanning image data Cjk are stored in a first storage area RCA, and the target image data Gmn are stored in a second storage area RTA.

In one case, (J−M+1)×(K−N+1)×M×N pieces of pixel data are stored as comparison image data relating to all comparison areas CM, and M×N pieces of pixel data are stored as target image data. In contrast, the technique discussed above requires the storage only of J×K pieces of pixel data as scanning image data, and M×N pieces of pixel data as target image data. This means the number of pieces of pixel data to be stored is reduced.

When the number of pieces of pixel data to be stored is reduced as in the present preferred embodiment, it is preferable not to employ DMA (direct memory access) in data access to the first storage area RCA and the second storage area RTA. It is preferable that the central processing unit CPU directly handles data access to realize increase in processing speed.

In the case discussed above, one piece of target image data and (J−M+1)×(K−N+1) pieces of pixel data relating to all comparison areas and corresponding to this target image data are stored. As compared to this case, the number of times pixel data are retrieved is reduced to 1/(M×N), thereby shortening processing speed.

A matching circuit HW constituted by hardware includes M×N selectors Smn and M×N operation circuits Qmn discussed above that are respectively grouped together as a group of selectors SY and a group of operation circuits QY in FIG. 6. The matching circuit HW receives the scanning image data Cjmkn and the target image data Gmn relating to all m's and n's that are respectively given from the first storage area RCA and the second storage area RTA. The scanning image data Cjmkn and the target image data Gmn are respectively given to the group of selectors SY and the group of operation circuits QY. The central processing unit CPU generates the scanning information PSV, and gives the same to the group of selectors SY. The scanning information PSV designates the position (s, t), so M×N pieces of comparison image data C(m+s)(n+t) are output from the group of selectors SY to the group of operation circuits QY.

The accumulation circuit SUM discussed above is also provided in the matching circuit HW. The cumulative total Dst is assigned by the accumulation circuit SUM to the register Rst for each position (s, t) designated by the scanning information PSV and stored in the register Rst. In FIG. 6, (J−M+1)×(K−N+1) registers Rst are grouped together as a group of registers RY. For simplification of the illustration in FIG. 6, registers are identified by using figures H=J−M and V=K−N.

The matching circuit HW further includes a matching judgment section MC. The matching judgment section MC receives (J−M+1)×(K−N+1) cumulative totals Dst given from the group of registers RY, and outputs position information PSF to the central processing unit CPU that is indicative of the position (s, t) providing the minimum value of these cumulative totals Dst. The comparison area CM placed at this position (s, t) indicated by the position information PSF is judged as having the closest similarity to the target area TA.

Figure 7:
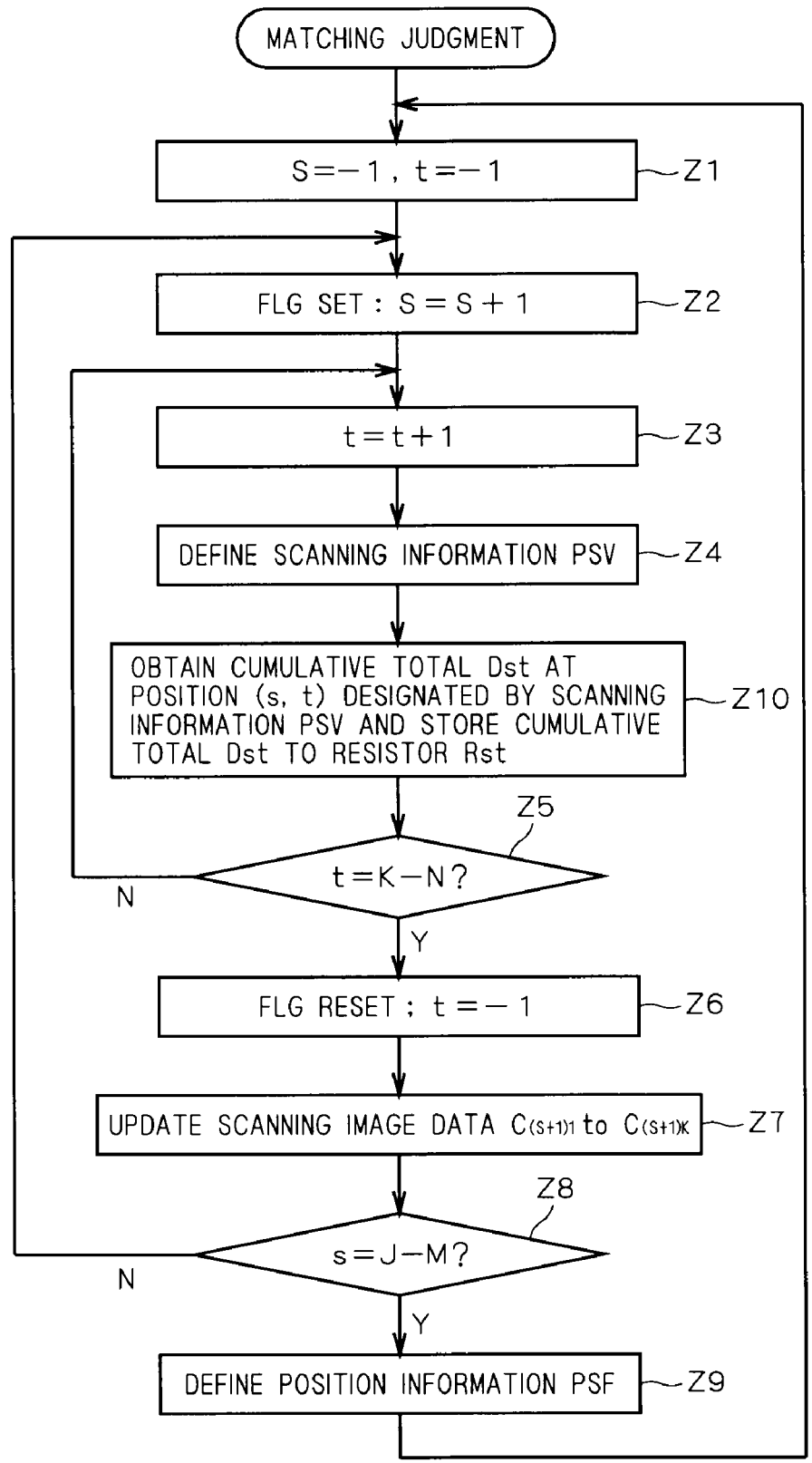
FIG. 7 is a flow diagram for executing matching judgment.

FIG. 7 is a flow diagram for executing matching judgment by updating the position (s, t). The central processing unit CPU is responsible for steps Z1 through Z8, and the matching circuit HW is responsible for steps Z9 and Z10.

After one scanning area CA is defined, the number of rows s and the number of columns tare initialized to "−1." Thereafter the number of rows s is increased in step Z2. After the execution of step Z2, the number of columns t is increased in step Z3. In the present preferred embodiment, the scanning of a scanning area does not employ "skipping" as discussed above, so the number of rows s and the number of columns t increase in increments of "1."

When step Z2 is executed for the first time after the execution of step Z1, the number of rows s is set to "0" in step Z2. That is, a first pixel in a comparison area and a first pixel in a scanning area have the same row number. When step Z3 is executed for the first time after the execution of step Z2, the number of columns t is set to "0" in step Z3. That is, a first pixel in a comparison area and a first pixel in a scanning area have the same column number.

After the execution of step Z3, the scanning information PSV designating the number of rows s and the number of columns t is defined in step Z4.

After the execution of step Z4, the cumulative total Dst is obtained at the position (s, t) designated by the scanning information PSV and is stored in the register Rst in step Z10. The details of the operation in step Z10 have already been given in the description relating to the operations of the selector Sm, the operation circuit Qmn and the accumulation circuit SUM.

Thereafter in step Z5, it is determined whether or not the number of columns t has reached a value (K−N). The value (K−N) is the maximum value of the number of columns t as discussed above. When a result obtained in step Z5 is Yes, the number of columns t is initialized to "−1" in step Z6. When the result obtained in step S5 is No, step Z3 is executed again to increase the number of columns t. Steps Z5, Z6 and Z3 are repeated after step Z2 is executed once. Thus, in the scanning of the scanning area CA to obtain the comparison area CM, the scanning in the column direction has higher priority than the scanning in the row direction.

Thereafter step Z7 discussed below is executed (step Z7 may be skipped). Then in step Z8, it is determined whether or not the number of rows s has reached a value (J−M). The value (J−M) is the maximum value of the number of rows s as discussed above. When a result obtained in step Z8 is No, step Z2 is executed again to increase the number of rows s. When the result obtained in step Z8 is Yes, the position information PSF is defined in step Z9 and step Z1 is executed again. Steps Z2 through Z8 are repeated after the scanning area CA is defined once. Thus, in the scanning of the scanning area CA to obtain the comparison area CM, the scanning in the row direction has lower priority than the scanning in the column direction.

Step Z7 is responsible for the update of scanning image data. After step Z6 is executed, K pieces of scanning image data C(s+1)1 to C(s+1)K arranged in the $(s+1)^{th}$ row and corresponding to pixels in the $(s+1)^{th}$ row and in the first to $K^{th}$ columns of the scanning area CA are made available for the comparison area CM. Pixel difference values Δmn(s+1)1 to Δmn(s+1)K are obtained for the scanning image data C(s+1)1 to C(s+1)K. Thus, the update of the scanning image data C(s+1)1 to C(s+1)K in step Z7 does not prevent block matching.

In contrast, the update of the scanning image data Cjk in a period of time from step Z3 to step Z5 prevents block matching. Thus, step Z7 is preferably executed after step Z5 as discussed above.

The update of the scanning image data Cjk more specifically employs a flag FLG indicating the rejection of data update. The scanning area CA is scanned in the row direction to obtain the comparison area CM. Thus, each time the number of rows s indicating the shift of the comparison area CM from the scanning area CA in the row direction is updated, the flag FLG is set (data update is rejected). When it is determined that the number of columns t has reached the value K−N in step Z5, the flag FLG is reset (the rejection of data update is eliminated).

A register RF shown in FIG. 6 stores the flag FLG. The set and reset of the flag FLG is realized by the central processing unit CPU. The value of the flag FLG is referred to by the central processing unit CPU.

FIG. 8 is a block diagram showing another exemplary structure of the operation circuit Qmn. With respect to the structure shown in FIG. 4, a coring circuit 19 is added in a stage subsequent to the absolute value circuit 13. The coring circuit 19 receives a positive threshold value CRTH, and an output of the absolute value circuit 13. The threshold value CRTH may be recorded in the coring circuit 19.

The coring circuit 19 outputs zero as the pixel difference value Δmnst when an output of the absolute value circuit 13 is not greater than the threshold value CRTH. The coring circuit 19 outputs a value as the pixel difference value Δmnst that is obtained by subtracting a nonnegative value from an output of the absolute value circuit 13 when the output of the absolute value circuit 13 is greater than the threshold value CRTH.

An output of the absolute value circuit 13 is thereby subjected to coring by using the threshold value CRTH, and a resultant value is employed as the pixel difference value Δmnst. This advantageously results in the determination of similarity which exhibits high noise immunity.

Figure 10:
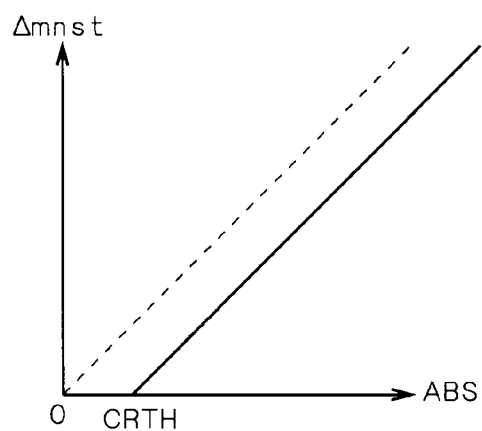
FIG. 10 is a graph showing a second characteristic of the coring circuit 19.

FIGS. 9 and 10 are graphs respectively showing first and second characteristics of the coring circuit 19. In each graph, the horizontal axis shows the value of an output ABS given from the absolute value circuit 13, and the vertical axis shows the pixel difference value Δmnst.

According to the characteristic shown in FIG. 9, a value obtained by subtracting zero from the output ABS, namely, the output ABS itself is given as the pixel difference value Δmnst when the output ABS is greater than the threshold value CRTH. According to the characteristic shown in FIG. 10, a value obtained by subtracting the threshold value CRTH from the output ABS is given as the pixel difference value Δmnst when the output ABS is greater than the threshold value CRTH.

The selection of the characteristic of the coring circuit 19 depends on how higher level processing employing block matching such as detection of motion vector is realized.

Figure 11:
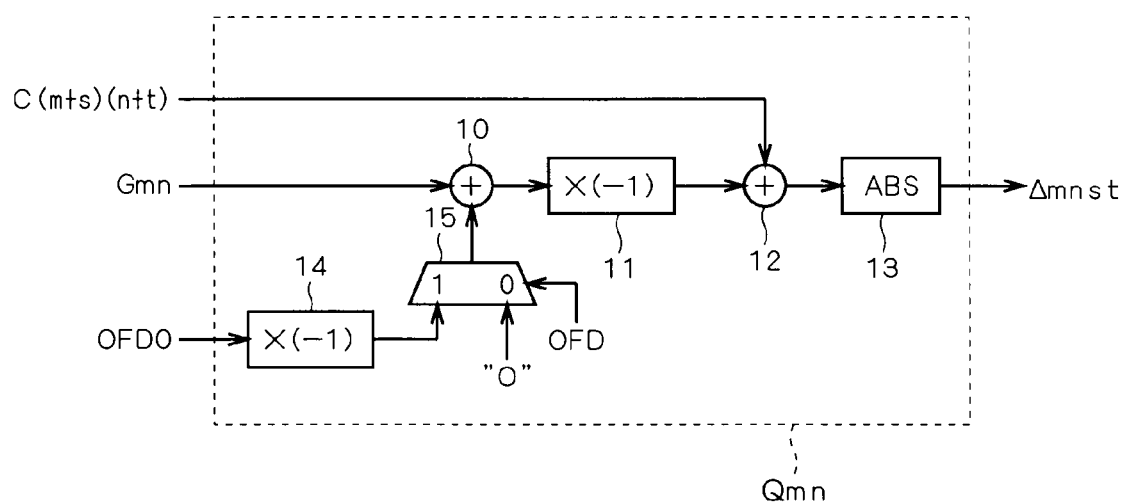
FIGS. 11 and 12 are block diagrams showing other exemplary structures of the operation circuit Qmn.

FIG. 11 is a block diagram showing still another exemplary structure of the operation circuit Qmn. With respect to the structure shown in FIG. 4, a subtracting circuit for subtracting an offset OFD0 from the value of the target image data Gmn is arranged in a stage precedent to the multiplier 11. This subtracting circuit includes a multiplier (or reverser) 14 for multiplying the offset OFD0 by "−1" (or reversing the polarity of the offset OFD0), and an adder 10 for adding an output of the multiplier 14 to the target image data Gmn.

In the exemplary structure shown in FIG. 11, the operation circuit Qmn further includes a selector 15 determining whether or not the offset OFD0 should be employed. The selector 15 receives an output of the multiplier 14 and "0," and decides which one should be given to the adder 10 under control of a signal OFD for determining whether or not offset should be employed.

As a result of the provision of this subtracting circuit, similarity between a target area and a comparison area is determined after the target area is offset. The selector 15 is capable of determining whether or not offset should be employed. When the offset OFD0 is at a constant value independent of the value of the target image data Gmn, a target area is subjected to what is called DC offset.

Figure 12:
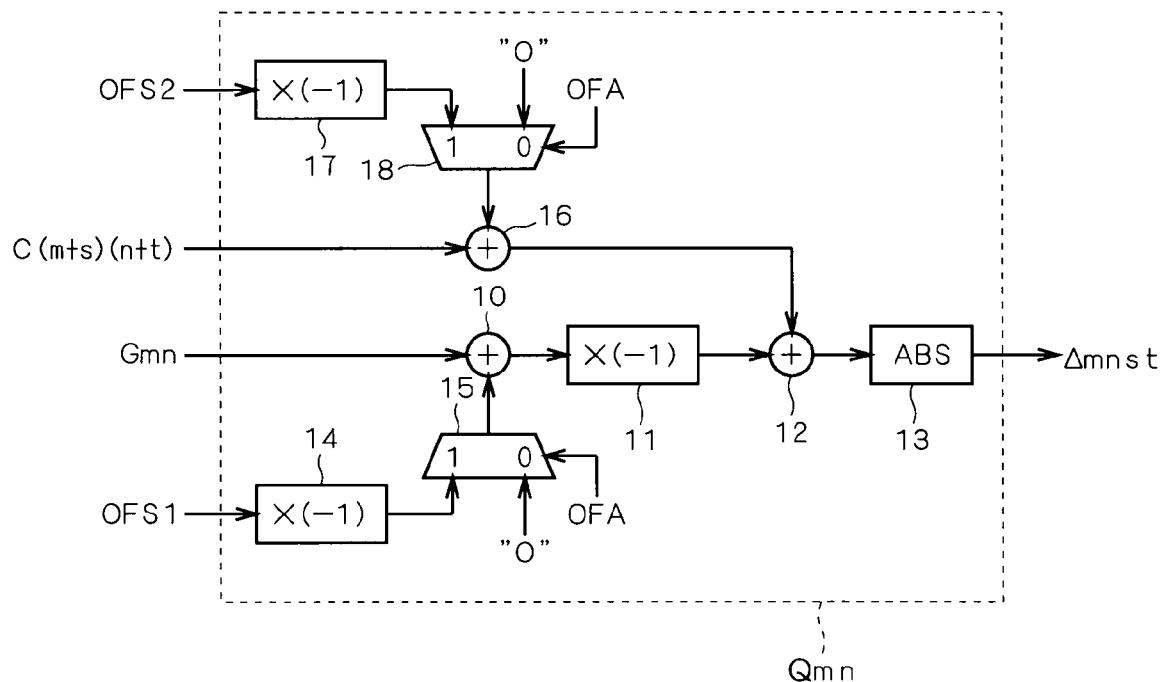

FIG. 12 is a block diagram showing still another exemplary structure of the operation circuit Qmn. With respect to the structure shown in FIG. 11, a subtracting circuit for subtracting an offset OFS2 from the value of the comparison image data C(m+s)(n+t) is added in a stage precedent to the adder 12. This subtracting circuit includes a multiplier (or reverser) 17 for multiplying the offset OFS2 by "−1" (or reversing the polarity of the offset OFS2), and an adder 16 for adding an output of the multiplier 17 to the comparison image data C(m+s)(n+t).

In the exemplary structure shown in FIG. 12, the operation circuit Qmn further includes a selector 18 determining whether or not the offset OFS2 should be employed. The selector 18 receives an output of the multiplier 17 and "0," and decides which one should be given to the adder 16 under control of a signal OFA for determining whether or not offset should be employed.

As a result of the provision of this subtracting circuit, similarity between a target area and a comparison area is determined after the comparison area is offset. The selector 18 is capable of determining whether or not offset should be employed. When the offset OFS2 is at a constant value independent of the value of the comparison image data C(m+s)(n+t), a comparison area is subjected to what is called DC offset.

In the exemplary structure of FIG. 12, an offset OFS1 is employed for a target area, and the signal OFA is responsible for the control of functions of both the selectors 15 and 18. Alternatively, in the structure shown in FIG. 12, the structure of FIG. 11 may be employed for the offset of a target area. In this case, the signals OFD and OFA independently determine whether or not offset should be employed for a target area and a comparison area respectively.

In the structure shown in FIG. 12, the offsets OFS1 and OFS2 may respectively be the mean values of target image data Gmn and comparison image data C(m+s)(n+t). In this case, a target area and a comparison area are subjected to what is called AC offset.

The selectors 15 and 18 may each receive a fixed value other than "0." In this case, the signal OFA makes switching between DC offset and AC offset.

Figure 13:
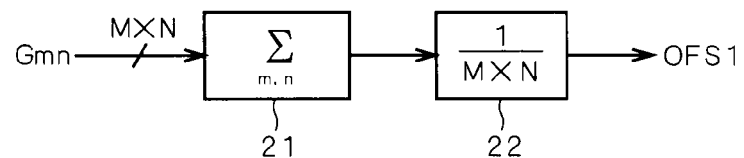
FIG. 13 is a block diagram showing a structure for obtaining the mean value of target image data Gmn.
Figure 14:
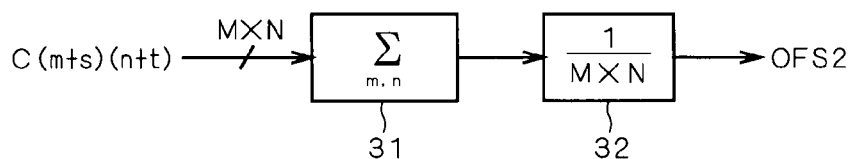
FIG. 14 is a block diagram showing a structure for obtaining the mean value of comparison image data C(m+s)(n+t)

FIGS. 13 and 14 are block diagrams respectively showing the structures for obtaining the mean values of the target image data Gmn and the comparison image data C(m+s)(n+t). The structures shown in FIGS. 13 and 14 may be incorporated in the operation circuit Qmn, or may be arranged outside the operation circuit Qmn.

In the exemplary structure shown in FIG. 13, an accumulation circuit 21 outputs the total sum of M×N pieces of target image data Gmn, and a dividing circuit 22 divides this total sum by M×N. As a result, the mean value of the M×N pieces of target image data Gmn is obtained as the offset OFS1.

In the exemplary structure shown in FIG. 14, an accumulation circuit 31 outputs the total sum of M×N pieces of comparison image data C(m+s)(n+t) with regard to some number of rows s and some number of columns t, and a dividing circuit 32 divides this total sum by M×N. As a result, the mean value of M×N pieces of comparison image data C(m+s)(n+t) corresponding to pixels in the $(J-s+1)^{th}$ row to the $(J-s+M)^{th}$ row and in the $(K-t+1)^{th}$ column to the $(K-t+N)^{th}$ column is obtained as the offset OFS2.

Figure 15:
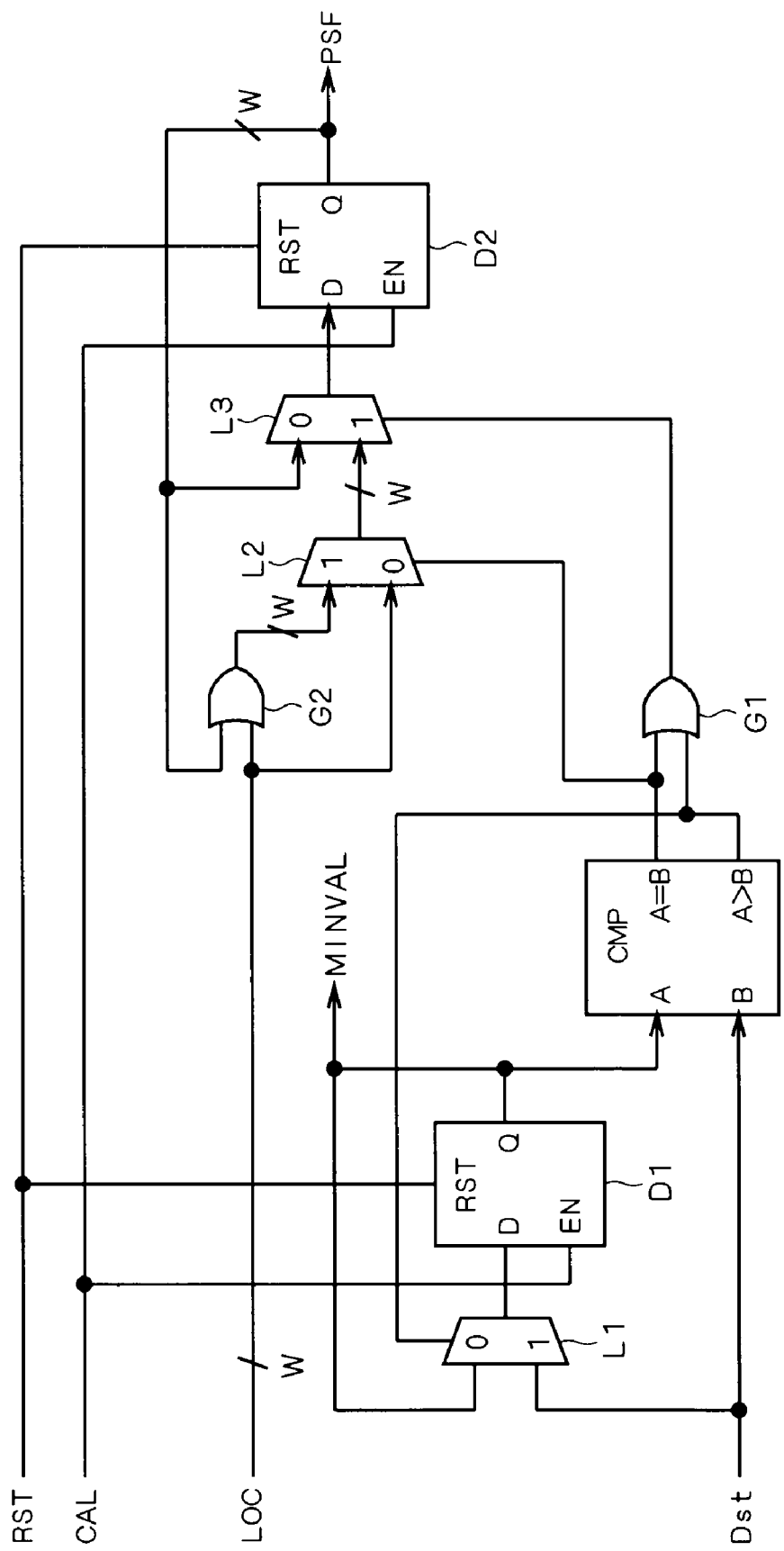
FIG. 15 is a circuit diagram showing an exemplary structure of a matching judgment section MC.

FIG. 15 is a circuit diagram showing an exemplary structure of the matching judgment section MC (see FIG. 6). The matching judgment section MC receives signals CAL, RST and data LOC. The matching judgment section MC also receives the cumulative totals Dst sequentially input thereto. The signal CAL allows matching judgment. The signal RST sets an initial value used for matching judgment. The activation of the signal CAL starts after the signal RST is activated. The signal CAL continues to be active during the input of all of the cumulative totals Dst relating to one target area.

The data LOC contains (J−M+1)×(K−N+1) digits each of which is capable of taking a binary number and only one digit of which exclusively takes a first value. The only one digit that takes the first value is sequentially shifted in the data LOC. The data LOC may be easily obtained for example by processing the scanning information PSV. For simplification of the illustration of the drawings, (J−M+1)×(K−N+1) is represented by a value W in the discussion below.

Figure 16:
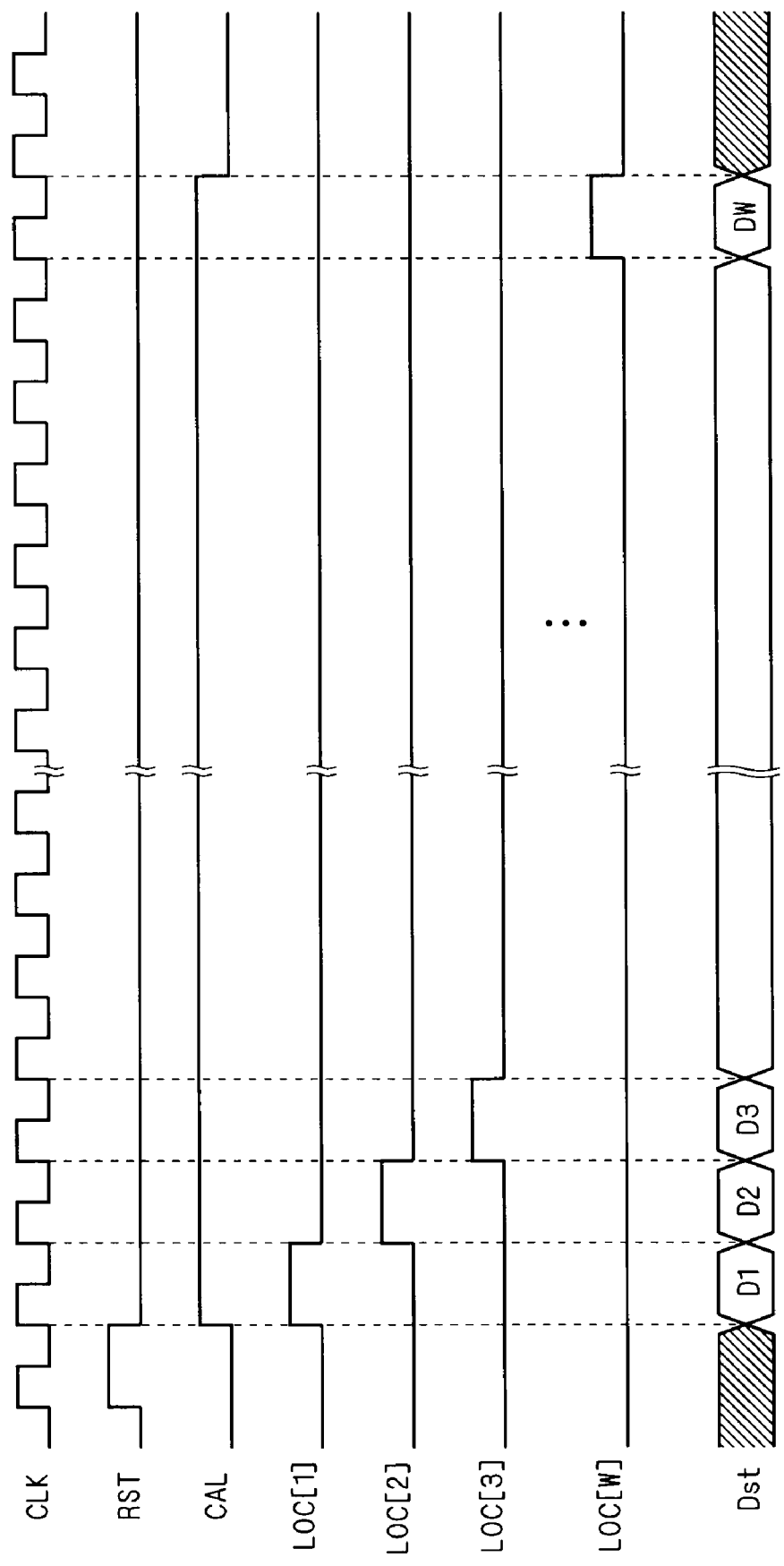
FIG. 16 is a timing diagram showing signals RST, CAL, data LOC, cumulative totals Dst and an operation clock CLK.

FIG. 16 is a timing diagram showing the signals RST, CAL, data LOC, cumulative totals Dst and an operation clock CLK. The signal RST is activated in synchronization with the operation clock CLK, and is active for a period of time corresponding to one cycle of the operation clock CLK. After the activation of the signal RST is finished, the signal CAL is activated in synchronization with the operation clock CLK, and is active for a period of time corresponding to W cycles of the operation clock CLK. While the signal CAL is active, each digit constituting the data LOC [W:1] is exclusively activated in a sequential manner from the first digit to the $W^{th}$ digit in synchronization with the operation clock CLK. The values of the cumulative totals Dst are represented as D1, D2, D3, . . . , and DW. These values are sequentially switched in synchronization with the operation clock CLK. As an example, the cumulative totals Dst are sequentially read out from the group of registers RY to be given to the matching judgment section MC.

The matching judgment section MC includes a minimum value storage circuit for storing a value MINIVAL. When the cumulative total Dst given to the matching judgment section MC is lower than the stored value MINIVAL, the stored value MINIVAL is updated by using this cumulative total Dst. An example of the specific structure of the minimum value storage circuit is discussed below.

The value MINIVAL is stored in a D flip-flop D1. While the signal CAL is active, the D flip-flop D1 outputs the value MINIVAL as its Q output in synchronization with the operation clock CLK.

The value MINIVAL and the cumulative totals Dst sequentially input are given to a comparator CMP and a selector L1.

The comparator CMP compares the value MINIVAL and the cumulative total Dst. The comparator CMP produces first and second outputs. The first output is activated when the cumulative total Dst is lower than the value MINIVAL (in FIG. 15, the output terminal from which the first output is given is identified as "A>B"). The second output is activated when the cumulative total Dst is equal to the value MINVAL (in FIG. 15, the output terminal from which the second output is given is identified as "A=B").

The selector L1 gives the cumulative total Dst to an input terminal of the D flip-flop D1 when the first output is active. When the first output is not active, the selector L1 gives the value MINIVAL to the input terminal of the D flip-flop D1.

The value MINIVAL is thereby updated by the cumulative total Dst lower than the value MINIVAL. Accordingly, when all cumulative totals Dst relating to one target area (namely, W cumulative totals Dst) are given, the cumulative total Dst taking the minimum value is obtained as the value MINIVAL from the Q output of the D flip-flop D1. In order to put this into practice, the D flip-flop D1 preferably stores a value not lower than an assumed value of the cumulative total Dst as an initial value of the value MINIVAL.

A D flip-flop D2 stores data containing W digits each taking a binary number. While the signal CAL is active, the D flip-flop D2 outputs data stored in the D flip-flop D2 itself as its Q output in synchronization with the operation clock CLK.

When process steps discussed later are executed, this data obtained as the Q output of the D flip-flop D2 becomes operative to function as the position information PSF. That is, when the value MINIVAL corresponds to the minimum value of the cumulative totals Dst, the D flip-flop D2 is operative to function as a minimum value position storage circuit for storing a position which provides this minimum value of the cumulative totals Dst.

A gate G1 outputs the logical sum of actuations of the first and second outputs of the comparator CMP. That is, the output of the gate G1 is activated when the cumulative total Dst is not greater than the value MINIVAL.

A gate G2 outputs the logical sum of actuations of the data LOC and the D flip-flop D2 that both contain W digits. This logical sum is obtained for each digit. Accordingly, the output of the gate G2 also contains W digits.

A selector L2 selectively gives an output of the gate G2 or the data LOC based on the second output of the comparator CMP. More specifically, when the second output is active (when the cumulative total Dst equals the value MINIVAL), the selector L2 gives the output of the gate G2. When the second output is not activated, the selector L2 gives the data LOC.

A selector L3 selectively gives an output of the selector L2 and the Q output of the D flip-flop D2 based on an output of the gate G1. More specifically, when either the first or second output of the comparator CMP is active (when the cumulative total Dst is not greater than the value MINIVAL), the selector L3 gives the output of the selector L2. When none of the first and second outputs of the comparator CMP is activated, the selector L3 gives the Q output of the D flip-flop D2.

By the actuation of the signal RST, data with W digits each of which is deactivated is employed as an initial value of a value to be stored in the D flip-flop D2.

When the value MINIVAL is updated by the cumulative total Dst, an output of the gate G1 is activated while the second output of the comparator CMP is not activated. Thus the selectors L2 and L3 output the data LOC as the D input of the D flip-flop D2, thereby updating data to be stored in the D flip-flop D2. An activated one of digits of the data stored and updated in the D flip-flop D2 corresponds to a digit of the data LOC which is activated in synchronization with the input of the cumulative total Dst and which has caused the value MINIVAL to be updated (namely, a digit applied for the update of the value MINIVAL).

There are two possible cases in which the value MINIVAL is not updated by the cumulative total Dst. In a first case, the cumulative total Dst equals the stored value MINIVAL. This cumulative total Dst may also be the minimum value of the cumulative totals Dst that are given after the activation of the signal RST. Hence, a digit of the data stored in the D flip-flop D2, corresponding to the activated digit of the data LOC in synchronization with the input of this cumulative total Dst, is also desirably activated.

At this time, both an output of the gate G1 and the second output of the comparator CMP are activated. Thus the selectors L2 and L3 give an output of the gate G2 to the D flip-flop D2. As discussed above, the gate G2 outputs the logical sum of actuations for each digit of the data LOC and the Q output of the D flip-flop D2. Thus, an activated one of W digits corresponding to the cumulative total Dst that has given a minimum value so far, and an activated one of W digits corresponding to the cumulative total Dst that has caused the first case to happen are both stored in the D flip-flop D2.

In a second case in which the value MINIVAL is not updated by the cumulative total Dst, the cumulative total Dst is greater than the stored value MINIVAL. In this case, W-digit data stored in the D flip-flop D2 should not be updated. As an output of the gate G1 is not activated in this case, the selector L3 gives the Q output of the D flip-flop D2 to the D flip-flop D2 as its D input independently of an output of the selector L2. The data stored in the D flip-flop D2 is thereby maintained.

The order in which the cumulative totals Dst are given to the matching judgment section MC relies on the order in which these cumulative totals Dst are read out from the group of registers RY. Generally, the order in which the cumulative totals Dst are read out from the group of registers RY is already known. So an activated digit of data stored in the D flip-flop D2 corresponds to the position (s, t) providing the minimum value of the cumulative totals Dst at this moment. Thus, when the value MINIVAL takes the minimum value of the cumulative totals Dst, the D flip-flop D2 is operative to store a position providing this minimum value.

FIG. 17 shows an example of the Q output of the D flip-flop D2 after all of the cumulative totals Dst relating to one target area (namely, W cumulative totals Dst) are given. This Q output is considered as the position information PSF. The third digit is active in the example shown in FIG. 17. Hence, it is shown that the comparison area CM placed at the position (s, t) giving the cumulative total Dst that was entered third after the activation of the signal RST is most similar to the target area TA.

The target image data Gmn may be handled as a single piece of data corresponding to a separate pixel. The target image data Gmn may alternatively be handled as cluster data that is pixel data corresponding to a group of pixels arranged in the same row of a target area. Such handling of data is desirable in terms of speedup in the data update of the second storage area RTA.

Figure 18:
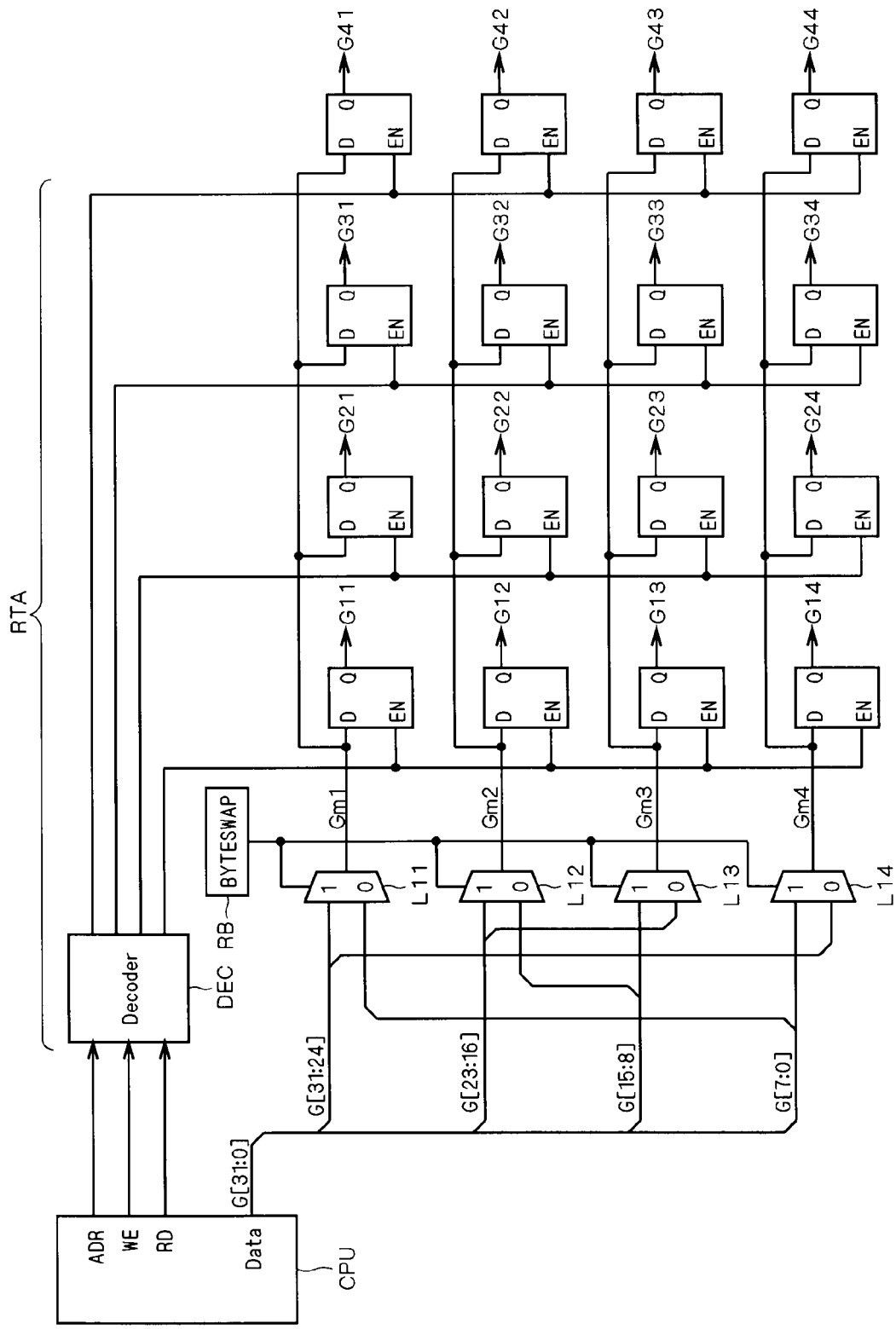
FIG. 18 is a block diagram showing an exemplary structure of a second storage area RTA.

FIG. 18 is a block diagram showing an exemplary structure of the second storage area RTA. The central processing unit CPU outputs an address signal ADR, a write enable signal WE and read data RD to a decoder DEC. Then the decoder DEC outputs 4-bit enable signals that are alternatively activated. The central processing unit CPU outputs a 32-bit signal G [31:0] as cluster data. Here, it is assumed that, in the target area TA, four pixels are arranged in one row and pixel data corresponding to one pixel is 8-bit data. Accordingly, the number of bits of the cluster data is 32.

The second storage area RTA includes selectors L11, L12, L13 and L14 corresponding in number to the columns of the target area TA, and D flip-flops corresponding in number to the pixels of the target area TA.

The cluster data G [31:0] is divided into 8-bit data, and these data are given to the selectors L11, L12, L13 and L14. More specifically, cluster data G [31:24] is given to a first input terminal of the selector L11 (the input terminal identified as "1." With regard to the other selectors L12, L13 and L14, first input terminals are also identified as "1"). The cluster data G [31:24] is also given to a second input terminal of the selector L14 (the input terminal identified as "0." With regard to the other selectors L11, L12 and L13, second input terminals are also identified as "0"). Cluster data G [23:16] is given to the first input terminal of the selector L12 and to the second input terminal of the selector L13. Cluster data G [15:8] is given to the first input terminal of the selector L13 and to the second input terminal of the selector L12. Cluster data G [7:0] is given to the first input terminal of the selector L14 and to the second input terminal of the selector L11. The selectors L11, L12, L13 and L14 output the cluster data given to their first input terminals or the cluster data given to their second input terminals as target image data Gm1, Gm2, Gm3 and Gm4, respectively.

The output of the selector L11 is given to each D input terminal of D flip-flops laterally arranged in the uppermost line in the drawing. The output of the selector L12 is given to each D input terminal of D flip-flops laterally arranged in the second line from the uppermost line in the drawing. The output of the selector L13 is given to each D input terminal of D flip-flops laterally arranged in the third line from the uppermost line in the drawing. The output of the selector L14 is given to each D input terminal of D flip-flops laterally arranged in the lowermost line in the drawing.

The 4-bit enable signals correspond to four columns of vertically arranged D flip-flops in the drawing. The 4-bit enable signals are alternatively activated as discussed above, so the D flip-flops vertically arranged in four columns are activated or deactivated while synchronization is maintained among the columns.

Thus, D flip-flops vertically arranged in one column in the drawing store pixel data corresponding to pixels arranged in the same row of the target area TA. As an example, the D flip-flops vertically arranged in the leftmost column in the drawing store the target image data G11, G12, G13 and G14 that are pixel data corresponding to pixels arranged in the first row of the target area TA. The D flip-flops vertically arranged in the second column from the leftmost column in the drawing store the target image data G21, G22, G23 and G24 that are pixel data corresponding to pixels arranged in the second row of the target area TA. The D flip-flops vertically arranged in the third column from the leftmost column in the drawing store the target image data G31, G32, G33 and G34 that are pixel data corresponding to pixels arranged in the third row of the target area TA. The D flip-flops vertically arranged in the rightmost column in the drawing store the target image data G41, G42, G43 and G44 that are pixel data corresponding to pixels arranged in the fourth row of the target area TA.

The arrangement of bits of the cluster data G [31:0] employs big-endian or little-endian. Hence, by controlling selective outputs of the selectors L11, L12, L13 and L14, the target image data Gm1, Gm2, Gm3 and Gm4 are the cluster data G [31:24], G [23:16], G [15:8] and G [7:0] respectively, or may be the cluster data G [7:0], G [15:8], G [23:16] and G [31:24] respectively. Namely, cluster data are easily handled regardless of whether little-endian or big-endian is employed. In FIG. 18, a signal BYTESWAP stored in a register RB is shown as an example of an element responsible for the control of such selection of selectors' functions.

The above-discussed swap of data may be employed not only for target image data but also for scanning image data. More specifically, pixel data of scanning image data may be handled as cluster data that is pixel data corresponding to a group of pixels arranged in the same row of a scanning area. Such handling of data is desirable in terms of speedup in the data update of the first storage area RCA.

While the invention has been shown and described in detail, the foregoing description is in all aspects illustrative and not restrictive. It is therefore understood that numerous modifications and variations can be devised without departing from the scope of the invention.

What is claimed is:

1. A block matching circuit, comprising:
    a first storage area for storing scanning image data that is pixel data corresponding to each one of pixels arranged in J rows and K columns contained in a scanning area that is an image area to be subjected to comparison in block matching;
    a second storage area for storing target image data that is pixel data corresponding to each one of pixels arranged in M rows and N columns contained in a target area that is an image area functioning as a standard for said comparison in said block matching, J, K, M and N being integers satisfying J>M and K>N;
    M×N operation circuits for obtaining pixel difference values indicative of differences between corresponding pixels, said pixel difference values being obtained between comparison image data and said target image data, said comparison image data being pixel data corresponding to each one of pixels arranged in M rows and N columns contained in each one of a plurality of comparison areas that are obtained by scanning said scanning area;
    M×N selection circuits for selecting said comparison image data for each one of said comparison areas from said first storage area and outputting the selected comparison image data to said operation circuits;
    an accumulation circuit for obtaining respective cumulative totals for said comparison areas, said cumulative totals each being given by accumulating said pixel difference values; and
    a matching judgment section for comparing said respective cumulative totals obtained for said comparison areas to specify said comparison area providing the minimum of said cumulative totals.

2. The block matching circuit according to claim 1, wherein said selection circuit corresponding to a pixel in the $m^{th}$ row and $n^{th}$ column of said target area (where m is an integer of 1 to M and n is an integer of 1 to N) is configured to:
    receive $(J-M+1)\times(K-N+1)$ pieces of said scanning image data that correspond to pixels in the $m^{th}$ row to the $(m+J-M)^{th}$ row and in the $n^{th}$ column to the $(n+K-N)^{th}$ column of said scanning area; and
    when said comparison area is shifted in position from said scanning area by s rows and t columns (where s is an integer of 0 to (J-M), and t is an integer of 0 to (K-N)), output said scanning image data corresponding to a pixel in the $(m+s)^{th}$ row and $(n+t)^{th}$ column.

3. The block matching circuit according to claim 2, wherein said operation circuit corresponding to a pixel in the $m^{th}$ row and $n^{th}$ column of said target area includes:
    a subtracting circuit for obtaining the difference in value between said target image data corresponding to a pixel in the $m^{th}$ row and $n^{th}$ column of said target area and said scanning image data corresponding to a pixel in the $(m+s)^{th}$ row and $(n+t)^{th}$ column of said scanning area; and
    an absolute value circuit for obtaining the absolute value of a result of said subtracting circuit.

4. The block matching circuit according to claim 3, wherein said operation circuit corresponding to a pixel in the $m^{th}$ row and $n^{th}$ column of said target area includes a coring circuit that outputs zero when an output of said absolute value circuit is not greater than a positive threshold value, said coring circuit outputting a value obtained by subtracting a nonnegative value from the output of said absolute value circuit when said output of said absolute value circuit is greater than said threshold value.

5. The block matching circuit according to claim 2, wherein said operation circuit corresponding to a pixel in the $m^{th}$ row and $n^{th}$ column of said target area includes:
    a first subtracting circuit for subtracting an offset from the value of said target image data corresponding to a pixel in the $m^{th}$ row and $n^{th}$ column of said target area;
    a second subtracting circuit for obtaining the difference between an output of said first subtracting circuit and the value of said scanning image data corresponding to a pixel in the $(m+s)^{th}$ row and $(n+t)^{th}$ column of said scanning area; and
    an absolute value circuit for obtaining the absolute value of a result of said second subtracting circuit.

6. The block matching circuit according to claim 5, wherein said offset is at a constant value independent of the value of said target image data.

7. The block matching circuit according to claim 5, wherein said operation circuit corresponding to a pixel in the $m^{th}$ row and $n^{th}$ column of said target area includes a coring circuit that outputs zero when an output of said absolute value circuit is not greater than a positive threshold value, said coring circuit outputting a value obtained by subtracting a nonnegative value from the output of said absolute value circuit when said output of said absolute value circuit is greater than said threshold value.

8. The block matching circuit according to claim 5, wherein said offset is the mean value of said target image data.

9. The block matching circuit according to claim 2, wherein said operation circuit corresponding to a pixel in the $m^{th}$ row and $n^{th}$ column of said target area includes:

a first subtracting circuit for subtracting an offset from the value of said scanning image data corresponding to a pixel in the $(m+s)^{th}$ row and $(n+t)^{th}$ column of said scanning area;

a second subtracting circuit for obtaining the difference between the value of said target image data corresponding to a pixel in the $m^{th}$ row and $n^{th}$ column of said target area and an output of said first subtracting circuit; and an absolute value circuit for obtaining the absolute value of a result of said second subtracting circuit.

10. The block matching circuit according to claim 9, wherein said offset is at a constant value independent of the value of said scanning image data.

11. The block matching circuit according to claim 9, wherein said operation circuit corresponding to a pixel in the $m^{th}$ row and $n^{th}$ column of said target area includes a coring circuit that outputs zero when an output of said absolute value circuit is not greater than a positive threshold value, said coring circuit outputting a value obtained by subtracting a nonnegative value from the output of said absolute value circuit when said output of said absolute value circuit is greater than said threshold value.

12. The block matching circuit according to claim 9, wherein said offset is the mean value of M×N pieces of pixel data corresponding to pixels in the $(J-s+1)^{th}$ row to the $(J-s+M)^{th}$ row and in the $(K-t+1)^{th}$ column to the $(K-t+N)^{th}$ column of said scanning area.

13. The block matching circuit according to claim 1, wherein said matching judgment section receives said cumulative totals sequentially input thereto, said matching judgment section including:

a minimum value storage circuit for storing a storage value as a value to be stored, and updating said storage value using said cumulative totals when said cumulative totals input thereto are lower than said storage value;

a minimum value position storage circuit for storing first data, each of (J−M+1)×(K−N+1) digits of said first data taking a binary number; and an update circuit for updating said first data, said update circuit being configured to:

receive second data input thereto in synchronization with said cumulative totals, each of (J−M+1)×(K−N+1) digits of said second data taking a binary number while one of said (J−M+1)×(K−N+1) digits that is sequentially shifted in said second data exclusively taking a first value; and update said first data using said second data when said cumulative totals input thereto are lower than said storage value.

14. The block matching circuit according to claim 13, wherein when said cumulative totals input thereto are equal to said storage value, said update circuit updates said first data using the logical sum for each digit of said second data and said first data stored most recently.

15. The block matching circuit according to claim 1, wherein pixel data of said target image data is handled as cluster data that is pixel data corresponding to a group of pixels arranged in the same row of said target area.

16. The block matching circuit according to claim 15, further comprising a plurality of selectors for performing swap of said cluster data for each column of said target area.

17. The block matching circuit according to claim 1, wherein pixel data of said scanning image data is handled as cluster data that is pixel data corresponding to a group of pixels arranged in the same row of said scanning area.

18. The block matching circuit according to claim 17, further comprising a plurality of selectors for performing swap of said cluster data for each column of said scanning area.

19. The block matching circuit according to claim 1, further comprising a register for storing a flag, wherein said plurality of comparison areas are obtained by scanning said scanning area in a row direction from the first row to the $J^{th}$ row, and scanning said scanning area in a column direction from the first column to the $K^{th}$ column, scanning in said column direction having higher priority than scanning in said row direction, said flag is set during scanning in said column direction, while said flag is reset when said scanning reaches the $K^{th}$ column, and update of said scanning image data is rejected when said flag is set.

20. A data update method which is executed in the block matching circuit according to claim 1, comprising the steps of:

obtaining said pixel difference value between said comparison image data and said target image data corresponding to a pixel in the first row and $N^{th}$ column of said target area, said comparison image data being said scanning image data corresponding to a pixel in the $(s+1)^{th}$ row and $K^{th}$ column (where s is an integer of 0 to (J−M)) of said scanning area; and thereafter, updating said scanning image data corresponding to pixels in the $(s+1)^{th}$ row and from the first column to the $K^{th}$ column of said scanning area, wherein said plurality of comparison areas are obtained by scanning said scanning area in a row direction from the first row to the $J^{th}$ row, and scanning said scanning area in a column direction from the first column to the $K^{th}$ column, scanning in said column direction having higher priority than scanning in said row direction.

* * * * *